(12) United States Patent
Kitamura et al.

(10) Patent No.: US 12,411,000 B2
(45) Date of Patent: Sep. 9, 2025

(54) STRAIN GAUGE

(71) Applicant: MINEBEA MITSUMI Inc., Nagano (JP)

(72) Inventors: Atsushi Kitamura, Nagano (JP); Toshiaki Asakawa, Nagano (JP); Aya Ono, Nagano (JP); Akiyo Yuguchi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 419 days.

(21) Appl. No.: 17/907,567

(22) PCT Filed: Mar. 26, 2021

(86) PCT No.: PCT/JP2021/012986
§ 371 (c)(1),
(2) Date: Sep. 28, 2022

(87) PCT Pub. No.: WO2021/200693
PCT Pub. Date: Oct. 7, 2021

(65) Prior Publication Data
US 2023/0147031 A1    May 11, 2023

(30) Foreign Application Priority Data

Mar. 30, 2020 (JP) ................. 2020-060534

(51) Int. Cl.
G01B 7/16 (2006.01)
G01L 1/22 (2006.01)

(52) U.S. Cl.
CPC ............... *G01B 7/20* (2013.01); *G01L 1/225* (2013.01); *G01L 1/2293* (2013.01)

(58) Field of Classification Search
CPC .......... G01B 7/20; G01L 1/225; G01L 1/2293
See application file for complete search history.

(56) References Cited

U.S. PATENT DOCUMENTS

| 3,867,231 A | 2/1975 | Casey |
| 4,658,233 A | 4/1987 | Uchida et al. |
| 4,758,816 A | 7/1988 | Blessing et al. |
| 4,937,550 A | 6/1990 | Tawada et al. |
| 5,154,247 A | 10/1992 | Nishimura et al. |
| 5,328,551 A | 7/1994 | Kovacich |
| 5,349,746 A | 9/1994 | Gruenwald et al. |

(Continued)

FOREIGN PATENT DOCUMENTS

| CN | 106248268 | 12/2016 |
| CN | 111417830 | 7/2020 |

(Continued)

OTHER PUBLICATIONS

International Search Report for PCT/JP2021/012986 mailed on Jun. 15, 2021.

(Continued)

*Primary Examiner* — Kyung S Lee
(74) *Attorney, Agent, or Firm* — IPUSA, PLLC

(57) ABSTRACT

A strain gauge includes a flexible resin substrate and a resistor formed of a film that includes Cr, CrN, and $Cr_2N$, the resistor being situated on or above the substrate. A film thickness of the resistor is greater than or equal to 100 nm and less than or equal to 700 nm.

10 Claims, 5 Drawing Sheets

(56) References Cited

U.S. PATENT DOCUMENTS

| | | | |
|---|---|---|---|
| 5,455,453 A * | 10/1995 | Harada | H01L 23/142 |
| | | | 257/500 |
| 5,622,901 A | 4/1997 | Fukada | |
| 5,914,168 A | 6/1999 | Wakamatsu et al. | |
| 6,512,510 B1 | 1/2003 | Maeda | |
| 8,232,026 B2 | 7/2012 | Kumar et al. | |
| 9,256,119 B2 | 2/2016 | Nam et al. | |
| 9,306,207 B2 | 4/2016 | Woo et al. | |
| 11,087,905 B2 | 8/2021 | Asakawa et al. | |
| 11,326,966 B2 * | 5/2022 | Asakawa | G01B 7/18 |
| 11,543,309 B2 * | 1/2023 | Misaizu | G01L 1/2287 |
| 11,796,404 B2 * | 10/2023 | Toda | H05K 1/0393 |
| 2003/0016116 A1 | 1/2003 | Blaha | |
| 2004/0056321 A1 | 3/2004 | Parsons | |
| 2004/0140868 A1 | 7/2004 | Takeuchi et al. | |
| 2005/0160837 A1 | 7/2005 | Tellenbach et al. | |
| 2005/0276990 A1 | 12/2005 | Kohara et al. | |
| 2008/0253085 A1 | 10/2008 | Soffer | |
| 2011/0109701 A1 | 5/2011 | Ohashi | |
| 2012/0190166 A1 | 7/2012 | Okuda | |
| 2012/0247220 A1 * | 10/2012 | Inamori | G01L 1/2281 |
| | | | 73/766 |
| 2013/0082970 A1 | 4/2013 | Frey et al. | |
| 2013/0181808 A1 | 7/2013 | Chen et al. | |
| 2013/0300254 A1 | 11/2013 | Fujii et al. | |
| 2015/0276517 A1 | 10/2015 | Ashida et al. | |
| 2015/0296607 A1 | 10/2015 | Yang et al. | |
| 2015/0348900 A1 | 12/2015 | Nishimura et al. | |
| 2016/0114584 A1 | 4/2016 | Abbot, Jr. et al. | |
| 2016/0282205 A1 | 9/2016 | Huo et al. | |
| 2016/0372606 A1 | 12/2016 | Ito et al. | |
| 2017/0123548 A1 | 5/2017 | Shih et al. | |
| 2017/0261388 A1 | 9/2017 | Ma et al. | |
| 2017/0336900 A1 | 11/2017 | Lee et al. | |
| 2017/0363486 A1 | 12/2017 | Okulov | |
| 2017/0370796 A1 | 12/2017 | Dusing et al. | |
| 2018/0217016 A1 | 8/2018 | Inamori et al. | |
| 2018/0275001 A1 | 9/2018 | Tokuda | |
| 2020/0076016 A1 | 3/2020 | Riemer et al. | |
| 2020/0271533 A1 | 8/2020 | Yuguchi et al. | |
| 2020/0292294 A1 | 9/2020 | Misaizu et al. | |
| 2020/0333199 A1 | 10/2020 | Asakawa et al. | |
| 2021/0003378 A1 | 1/2021 | Asakawa et al. | |
| 2021/0018382 A1 | 1/2021 | Misaizu et al. | |
| 2021/0033476 A1 | 2/2021 | Toda et al. | |
| 2021/0063259 A1 | 3/2021 | Misaizu et al. | |
| 2021/0247210 A1 | 8/2021 | Asakawa et al. | |
| 2021/0270683 A1 | 9/2021 | Kitamura et al. | |
| 2023/0358623 A1 * | 11/2023 | Ono | G01B 7/16 |

FOREIGN PATENT DOCUMENTS

| | | |
|---|---|---|
| EP | 0171467 | 2/1986 |
| EP | 725392 | 8/1996 |
| EP | 3690385 | 8/2020 |
| JP | S49-042780 | 4/1974 |
| JP | S57-184914 | 11/1982 |
| JP | S58-097607 | 6/1983 |
| JP | S58-169150 | 10/1983 |
| JP | S61-176803 | 8/1986 |
| JP | S63-245962 | 10/1988 |
| JP | H01-202601 | 8/1989 |
| JP | H02-189981 | 7/1990 |
| JP | H03-191802 | 8/1991 |
| JP | H04-038402 | 2/1992 |
| JP | H04-095738 | 3/1992 |
| JP | H05-080070 | 3/1993 |
| JP | H05-145142 | 6/1993 |
| JP | H06-300649 | 10/1994 |
| JP | H07-71906 | 3/1995 |
| JP | H07-113697 | 5/1995 |
| JP | H07-306002 | 11/1995 |
| JP | H08-102163 | 4/1996 |
| JP | H08-304200 | 11/1996 |
| JP | H09-016941 | 1/1997 |
| JP | H09-197435 | 7/1997 |
| JP | H10-270201 | 10/1998 |
| JP | 2001-221696 | 8/2001 |
| JP | 2002-221453 | 8/2002 |
| JP | 2003-097906 | 4/2003 |
| JP | 2003-324258 | 11/2003 |
| JP | 2004-072715 | 3/2004 |
| JP | 2007-173544 | 7/2007 |
| JP | 2010-070850 | 4/2010 |
| JP | 2010-243192 | 10/2010 |
| JP | 2012-151338 | 8/2012 |
| JP | 2013-117422 | 6/2013 |
| JP | 2013-217763 | 10/2013 |
| JP | 2014-074661 | 4/2014 |
| JP | 2015-031633 | 2/2015 |
| JP | 2016-017882 | 2/2016 |
| JP | 2016-074934 | 5/2016 |
| JP | 2016-136605 | 7/2016 |
| JP | 2016-225598 | 12/2016 |
| JP | 2017-067764 | 4/2017 |
| JP | 2017-101983 | 6/2017 |
| JP | 2017-129417 | 7/2017 |
| JP | 2017-210572 | 11/2017 |
| JP | 2017-210573 | 11/2017 |
| JP | 2018-151203 | 9/2018 |
| JP | 2019-066312 | 4/2019 |
| JP | 2019-066313 | 4/2019 |
| JP | 2019-066454 | 4/2019 |
| JP | 2019-113411 | 7/2019 |
| WO | 2017/094368 | 6/2017 |

OTHER PUBLICATIONS

Office Action mailed on Jul. 2, 2024 with respect to the corresponding Japanese patent application No. 2020-060534.
Office Action mailed on Jan. 28, 2022 with respect to the related U.S. Appl. No. 16/955,329.
Office Action mailed on Jan. 30, 2022 with respect to the corresponding Chinese Patent Application No. 201880076802.7.
International Search Report for PCT/JP2018/035938 mailed on Dec. 18, 2018.
Extended European Search Report mailed on May 11, 2021 with respect to the corresponding European Patent Application No. 18863058.6 with respect to the corresponding Chinese Patent Application.
Office Action mailed on Apr. 22, 2021 No. 201880076802.7.
International Search Report for PCT/JP2018/046854 mailed on Feb. 12, 2019.
Yujiro Sakurauchi, "Handbook for utilizing industrial materials", Jan. 25, 1989, pp. 114-149, 166-169, 174-175, 226-235.
Office Action mailed on Sep. 27, 2021 with respect to the corresponding Chinese patent application No. 201880089676.9.
International Search Report for PCT/JP2018/035727 mailed on Dec. 18, 2018.
Office Action mailed on May 28, 2021 with respect to the related Chinese patent application No. 201880076801.2.
Extended European Search Report mailed on Jun. 4, 2021 with respect to the related European patent application No. 18860610.7.
Office Action dated Dec. 7, 2021 with respect to the related Japanese patent application No. 2017-191821.
Office Action dated Jan. 6, 2022 with respect to the related Chinese patent application No. 201880076443.5.
Office Action dated Jan. 12, 2022 with respect to the related Chinese patent application No. 201880076801.2.
Extended European Search Report dated May 10, 2021 (EP Patent Application No. 18860865.7).
International Search Report for PCT/JP2018/035713 mailed on Dec. 11, 2018.
Office Action dated Oct. 8, 2020 (U.S. Appl. No. 16/758,506).
Extended European Search Report mailed on Jun. 17, 2021 with respect to the related European Patent Application No. 18863695.5.
Office Action mailed on Jun. 1, 2021 with respect to the related Chinese Patent Application No. 201880084755.0.

(56) References Cited

OTHER PUBLICATIONS

Office Action dated Dec. 7, 2021 with respect to the related Japanese patent application No. 2017-210571.
Office Action mailed on Jan. 25, 2022 with respect to the corresponding Japanese patent application No. 2017-246871.
International Search Report for PCT/JP2019/014528 mailed on Jun. 25, 2019.
Shintaku, Kazuhiko, "Thin-film manufacturing by a sputtering method and its application", The 1st joint education workshop of National Institute of Technology, Akita College, [online], 2014, [retrieval date Jun. 17, 2019] Internet: URL: http://akita-nct.coop-edu.jp/assets/uploads/2014/12/6c13667c41571e8378dc2994ce1fcbd4.pdf, non-official translation, published on Dec. 9, 2014. With Partial English Translation.
Office Action mailed on Dec. 27, 2021 with respect to the related U.S. Appl. No. 16/650,553.
Office Action mailed on Apr. 12, 2022 with respect to the related Japanese patent application No. 2018-052421.
Office Action mailed on Apr. 12, 2022 with respect to the related Japanese patent application No. 2018-052422.
Office Action mailed on May 3, 2022 with respect to the related U.S. Appl. No. 16/650,963.
Office Action mailed on Apr. 29, 2022 with respect to the corresponding Chinese patent application No. 201880089676.9 (With Partial Translation).
Office Action mailed on May 5, 2022 with respect to the related Chinese patent application No. 201980022374.4 (With Partial Translation).
International Search Report for PCT/JP2018/035939 mailed on Dec. 18, 2018.
International Search Report for PCT/JP2018/040357 mailed on Jan. 15, 2019.
Office Action mailed on Dec. 7, 2021 with respect to the corresponding Japanese patent application No. 2020-098850.
Office Action mailed on Jan. 6, 2022 with respect to the corresponding Chinese patent application No. 201880076750.3.
Office Action mailed on Jan. 13, 2022 with respect to the related Chinese patent application No. 201880084755.0.
Extended European Search Report dated May 10, 2021 (EP Patent Application No. 18862478.7).
International Search Report for PCT/JP2018/035706 mailed on Dec. 11, 2018.
Japanese Office Action for 2017-191820 mailed on Mar. 17, 2020.
Office Action mailed Jun. 6, 2022 with respect to the related U.S. Appl. No. 16/650,553.
Office Action mailed Jun. 6, 2022 with respect to the related U.S. Appl. No. 17/043,898.
Office Action mailed on Sep. 6, 2022 with respect to the related Japanese patent application No. 2017-191821.
Office Action mailed on Sep. 6, 2022 with respect to the related Japanese patent application No. 2017-210571.
Office Action mailed on Sep. 6, 2022 with respect to the related Japanese patent application No. 2020-098850.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Haruhiro Kobayashi, Nikkan Kogyo Shimbun, Ltd., "Sputter thin film—Fundamentals and Applications", 1st Edition, 1st Printing, p. 102-107, Feb. 25, 1993 (With Partial Translation).
Shigeru Ikeda et al., Osaka National Research Institute, AIST, "Improvement of Oxidation Resistivity of Carbon Material by Borosilicate Glass Impregnation", TANSO, 1994, No. 162, p. 84-91, Jun. 28, 2010.
Kyoritsu Shuppan Co., Ltd., "Dictionary of Crystal Growth", 1st Edition, 1st Printing, p. 50-51, Jul. 25, 2001 (With Partial Translation).
Iwanami Shoten, Publishers., "Dictionary of Chemistry", 4th Edition, 7th Printing, p. 364, Jul. 20, 1992 (With Partial Translation).
Office Action mailed on Oct. 11, 2022 with respect to the related Japanese patent application No. 2017-246871.
Office Action mailed on Oct. 18, 2022 with respect to the related Japanese patent application No. 2018-052421.
Office Action mailed on Oct. 18, 2022 with respect to the related Japanese patent application No. 2018-052422.
Office Action mailed on Nov. 8, 2022 with respect to the related Japanese patent application No. 2018-073438.
Japan Metal Society, "Metal Data Book", 4th Edition, 4th Printing, pp. 132, Jul. 10, 2008 (With Partial Translation).
Office Action mailed on Apr. 22, 2025 with respect to the related Japanese patent application No. JP2023-132341.

\* cited by examiner

STRAIN GAUGE

TECHNICAL FIELD

The present invention relates to a strain gauge.

BACKGROUND ART

A strain gauge, which includes a resistor on a substrate, is known to be attached to a measured object to detect strain of the measured object. For example, the strain gauge is used in a sensor application, such as a sensor to detect strain of material or a sensor to detect ambient temperature (see, for example, Patent Document 1).

CITATION LIST

Patent Document

[Patent Document 1] Japanese Unexamined Patent Application Publication No. 2001-221696

SUMMARY

However, in addition to the sensor application, the strain gauge is used in a weighing application, in some cases. In such cases, it is necessary to satisfy more stringent standards concerning creep, compared to the sensor application. Thus, there are cases where even the strain gauge capable of being used in the sensor application cannot be used in the weighing application.

In view of the point described above, an object of the present invention is to provide a strain gauge that is capable of being used in the weighing application.

A strain gauge includes a flexible resin substrate and a resistor formed of a film that includes Cr, CrN, and $Cr_2N$, the resistor being situated on or above the substrate. A film thickness of the resistor is greater than or equal to 100 nm and less than or equal to 700 nm.

Effect of the Invention

According to a disclosed technique, a strain gauge capable of being used in a weighing application can be provided.

DESCRIPTION OF EMBODIMENTS

One or more embodiments will be described below with reference to the drawings. In each figure, the same numerals denote the same components, and accordingly, duplicative description of thereof may be omitted.

First Embodiment

Figure 1:
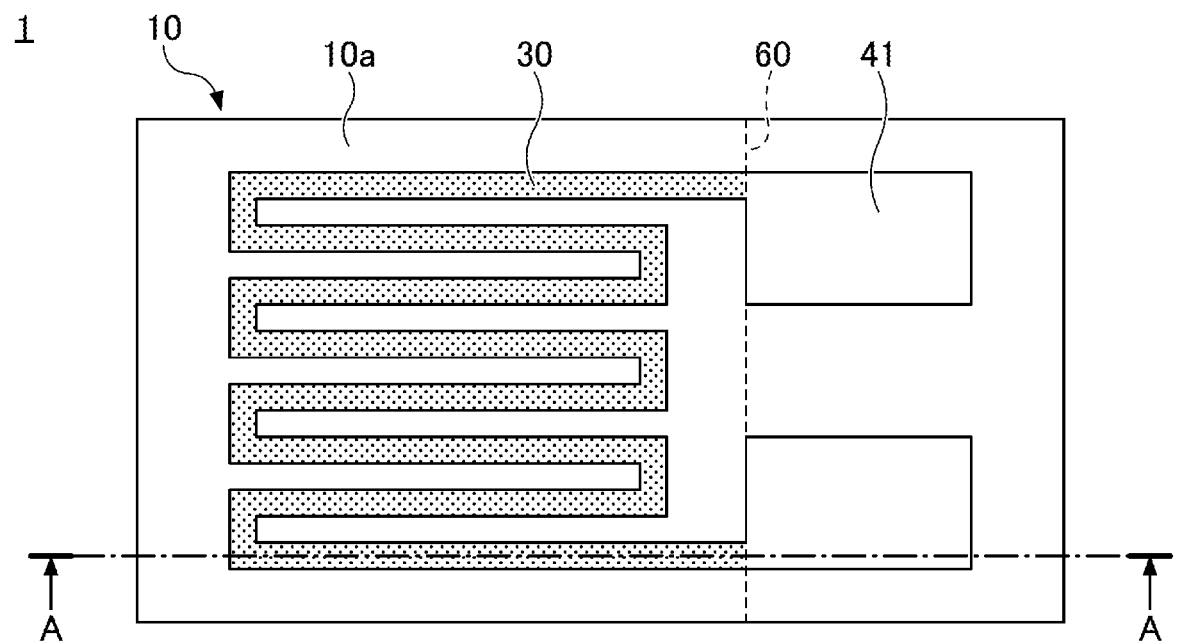
FIG. 1 is a plan view of an example of a strain gauge according to a first embodiment.
Figure 2:
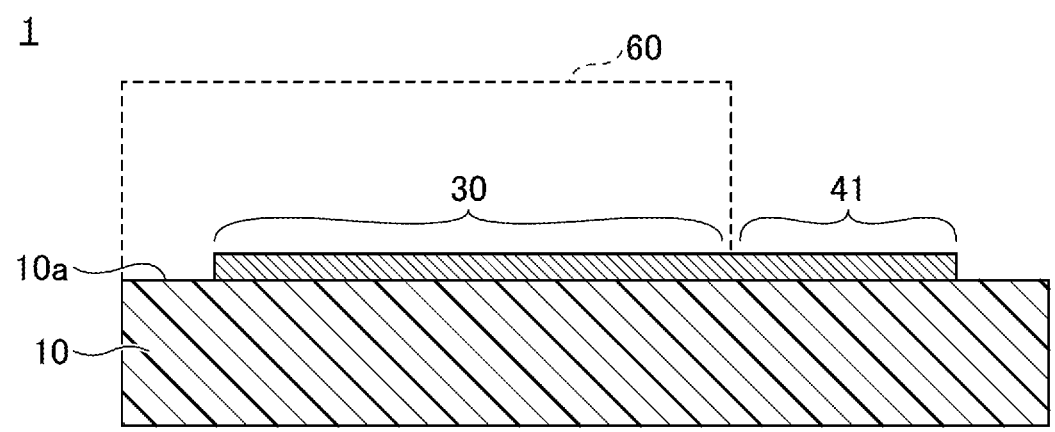
FIG. 2 is a cross-sectional view (first part) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates the cross section taken along the A-A line in FIG. 1. Referring to FIGS. 1 and 2, a strain gauge 1 includes a substrate 10, a resistor 30, and terminal sections 41.

In the present embodiment, for the sake of convenience, for the strain gauge 1, the side of the substrate 10 where the resistor 30 is provided is referred to as an upper side or one side, and the side of the substrate 10 where the resistor 30 is not provided is referred to as a lower side or another side. Further, for each component, the surface on the side where the resistor 30 is provided is referred to as one surface or an upper surface, and the surface on the side where the resistor 30 is not provided is referred to as another surface or a lower surface. However, the strain gauge 1 can be used in a state of being upside down, or can be disposed at any angle. Further, a plan view means that an object is viewed in a direction normal to an upper surface 10a of the substrate 10, and a planar shape refers to a shape of an object when viewed in the direction normal to the upper surface 10a of the substrate 10.

The substrate 10 is a member that is a base layer for forming the resistor 30 or the like, and is flexible. The film thickness of the substrate 10 is not particularly restricted and can be appropriately selected for any purpose. For example, such a thickness can be approximately 5 μm to 500 μm. In particular, when the film thickness of the substrate 10 is 5 μm to 200 μm, it is preferable in terms of strain transfer from a flexure element surface that is bonded to a lower surface of the substrate 10 via an adhesive layer or the like and of dimensional stability with respect to environment, and when the film thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. The film refers to a flexible member having a film thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor 30 is a thin film formed in a predetermined pattern and is a sensitive section where resistance varies in accordance with strain. The resistor 30 may be formed directly on the upper surface 10a of the substrate 10, or may be formed above the upper surface 10a of the substrate 10, via another layer. In FIG. 1, for the sake of convenience, the resistor 30 is illustrated in a crepe pattern.

The resistor 30 can be formed of, for example, material including Cr (chromium), material including Ni (nickel), or material including both Cr and Ni. In other words, the resistor 30 can be formed of material including at least one of Cr or Ni. An example of the material including Cr includes a Cr composite film. An example of the material including nickel includes Cu—Ni (copper nickel). An example of the material including both Cr and Ni includes NiCr (nickel chromium).

Here, the Cr composite film is a composite film of Cr, CrN, and $Cr_2N$, and the like. The Cr composite film may include incidental impurities such as chromium oxide.

For example, when the resistor 30 is a Cr composite film, the resistor 30 is formed with α-Cr (alpha-chromium), as a main component, that has a stable crystalline phase, and thus stability of the gauge characteristics can be improved. By forming the resistor 30 with α-Cr as the main component, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. Here, the main component means that a target substance is at 50% by weight or more of total substances that constitute the resistor. The resistor 30 preferably includes α-Cr at 80% by weight or more, from the viewpoint of improving the gauge characteristics. More preferably, the resistor 30 includes α-Cr at 90% by weight or more. The α-Cr is Cr having a bcc structure (body-centered cubic structure).

When the resistor 30 is the Cr composite film, CrN and $Cr_2N$ included in the Cr composite film are preferably at 20% by weight or less. When CrN and $Cr_2N$ included in the Cr composite film are at 20% by weight or less, reductions in the gauge factor can be suppressed.

A percentage of $Cr_2N$ in the CrN and $Cr_2N$ is preferably greater than or equal to 80% by weight and less than 90% by weight, and more preferably greater than or equal to 90% by weight and less than 95% by weight. When the percentage of $Cr_2N$ in the CrN and $Cr_2N$ is greater than or equal to 90% by weight and less than 95% by weight, TCR (negative TCR) is further reduced significantly by $Cr_2N$ having a semiconductor characteristic. Further, with reductions in making of ceramics, brittle fracture is reduced.

When a trace amount of $N_2$ or atomic N, which is mixed into a given film, is present, the external environment (e.g., in a high temperature environment) causes the trace amount of $N_2$ or atomic N to escape from the given film, thereby resulting in changes in film stress. By creating chemically stable CrN, a stable strain gauge can be obtained without forming the unstable N.

The terminal sections 41 respectively extend from both end portions of the resistor 30 and are each wider than the resistor 30 to be in an approximately rectangular shape, in a plan view. The terminal sections 41 are a pair of electrodes for externally outputting changes in a resistance value of the resistor 30 in accordance with strain, and for example, a lead wire or the like for an external connection is joined to each terminal section. For example, the resistor 30 extends from one terminal section 41, with zigzagged hairpin turns, to be connected to another terminal section 41. The upper surface of each terminal section 41 may be coated with a metal allowing for better solderability than the terminal section 41. For the sake of convenience, the resistor 30 and the terminal sections 41 are indicated by different numerals. However, the resistor and the terminal sections can be integrally formed of the same material, in the same process.

A cover layer 60 (insulating resin layer) may be disposed on and above the upper surface 10a of the substrate 10, such that the resistor 30 is coated and the terminal sections 41 are exposed. With the cover layer 60 being provided, mechanical damage and the like can be prevented from occurring in the resistor 30. Additionally, with the cover layer 60 being provided, the resistor 30 can be protected against moisture and the like. The cover layer 60 may be provided to cover all portions except for the terminal sections 41.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted and can be appropriately selected for any purpose. For example, the thickness can be approximately 2 μm to 30 μm.

A preferable thickness of the resistor 30 will be described below. When the strain gauge 1 is used in the sensor application, the film thickness of the resistor 30 is not particularly restricted and can be appropriately selected for any purpose. The film thickness can be, for example, approximately 50 nm to 2000 nm. In particular, when the film thickness of the resistor 30 is 100 nm or more, it is preferable in terms of improvement in crystallinity (e.g., crystallinity of α-Cr) of a crystal that constitutes the resistor 30, and when the film thickness of the resistor 30 is 1000 nm or less, it is further preferable in terms of reductions in cracks of a given film caused by internal stress of the film that constitutes the resistor 30, or of reductions in warp in the substrate 10.

When the strain gauge 1 is used in the weighing application, it needs to conform to the standards required in creep. The standards required in creep include, for example, accuracy class C1 (hereinafter referred to as the C1 standard) specified by OIML R60, and include accuracy class C2 (hereinafter referred to as the C2 standard) specified by OIML R60.

In the C1 standard, each of a given creep amount and a given creep recovery amount requires to correspond to ±0.0735% or less. In the C2 standard, each of a given creep amount and a given creep recovery amount requires to correspond to ±0.0368% or less. When the strain gauge 1 is used in the sensor application, each of a given creep amount and a given creep recovery amount is specified to correspond to about ±0.5%.

As a result of intensive investigation, the inventors have found that the creep highly depends on the film thickness of the resistor 30. In this case, in order to satisfy the C1 standard and the C2 standard, the film thickness of the resistor 30 needs to be set within a range that is narrower than the range of 50 nm to 2000 nm.

Specifically, in order to satisfy the C1 standard, the film thickness of the resistor 30 is preferably greater than or equal to 100 nm and less than or equal to 700 nm, in consideration of a given film thickness that causes improvement in crystallinity of a crystal that constitutes the resistor 30, as discussed above.

In order to satisfy the C2 standard, the film thickness of the resistor 30 is preferably greater than or equal to 150 nm and less than or equal to 500 nm. Further, in order to reliably satisfy the C2 standard, the film thickness of the resistor 30 is preferably greater than or equal to 250 nm and less than or equal to 400 nm, in consideration of a margin of 50% (that is, in order to satisfy a value that is half that specified by the C2 standard).

As a result of intensive investigation by the inventors, creep is also dependent on the film thickness of the substrate 10, but not as much as the creep is dependent on the film thickness of the resistor 30. With this arrangement, when the film thickness of the resistor 30 is within the above range, and further the film thickness of the substrate 10 is within a range that is narrower than the above range of 5 μm to 500

μm, each of a given creep amount and a given recovery amount can be further reduced.

Specifically, in order to satisfy the C1 standard, the film thickness of the substrate 10 is preferably greater than or equal to 5 μm and less than or equal to 130 μm. In order to satisfy the C2 standard, the film thickness of the substrate 10 is preferably greater than or equal to 5 μm and less than or equal to 100 μm.

In any case, by setting a lower limit for the film thickness of the substrate 10 to be 10 μm or more, an effect of providing good insulation can be also obtained. That is, in order to satisfy the C1 standard, the film thickness of the substrate 10 is preferably greater than or equal to 10 μm and less than or equal to 130 μm, in consideration of ensuring the insulation. Also, in order to satisfy the C2 standard, the film thickness of the substrate 10 is preferably greater than or equal to 10 μm and less than or equal to 100 μm.

Further, in order to reliably satisfy the C2 standard, the film thickness of the substrate 10 is preferably greater than or equal to 30 μm and less than or equal to 70 μm, in consideration of a margin of 50% (that is, in order to satisfy a value that is half a value specified by the C2 standard).

As described above, the strain gauge 1 can be used in the weighing application, by defining the film thickness of the resistor 30 more strictly than before. Further, the strain gauge 1 can be used in the weighing application, with a sufficient margin, by defining the film thickness of the resistor 30 more strictly than before and further by defining the film thickness of the substrate 10 more strictly than before. However, the strain gauge 1 may be used in the sensor application.

In order to manufacture the strain gauge 1, first, the substrate 10 is prepared and a metallic layer (referred to as a metallic layer A for the sake of convenience) is formed on the upper surface 10a of the substrate 10. The metallic layer A is a layer that is finally patterned to become the resistor 30 and terminal sections 41. With this arrangement, the material and thickness of the metallic layer A are the same as the material and thickness for each of the resistor 30 and the terminal sections 41 as described above.

The metallic layer A can be deposited by magnetron sputtering in which, for example, a source material capable of forming the metallic layer A is a target. Instead of the magnetron sputtering, the metallic layer A may be deposited by reactive sputtering, vapor deposition, arc ion plating, pulsed laser deposition, or the like.

From the viewpoint of stabilizing the gauge characteristics, before the depositing of the metallic layer A, a functional layer, as a base layer, that has a predetermined film thickness, is preferably vacuum-deposited on the upper surface 10a of the substrate 10, by conventional sputtering, for example.

In the present application, the functional layer refers to a layer that has a function of promoting crystal growth of the metallic layer A (resistor 30) that is at least an upper layer. Also, the functional layer preferably has a function of preventing oxidation of the metallic layer A caused by oxygen and moisture that are contained in the substrate 10, as well as a function of improving adhesion between the substrate 10 and the metallic layer A. The functional layer may further have any other function.

The insulating resin film that constitutes the substrate 10 contains oxygen and moisture. In this regard, particularly when the metallic layer A includes Cr, it is effective for the functional layer to have a function of preventing oxidation of the metallic layer A, because Cr forms an autoxidized film.

The material of the functional layer is not particularly restricted as long as that material is material having a function of promoting crystal growth of the metallic layer A (resistor 30) that is at least an upper layer. Such material can be appropriately selected for any purpose and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed of a conductive material such as a metal or an alloy, the film thickness of the functional layer is preferably one-twentieth or less the film thickness of the resistor. When such a range is set, crystal growth of α-Cr can be promoted, and further, a portion of the current flowing through the resistor flows through the functional layer. Thus, reductions in detection sensitivity of strain can be prevented.

More preferably, when the functional layer is formed of the conductive material such as a metal or an alloy, the film thickness of the functional layer is one-fiftieth or less the film thickness of the resistor. When such a range is set, crystal growth of α-Cr can be promoted, and further, a portion of the current flowing through the resistor flows through the functional layer. Thus, reductions in detection sensitivity of strain can be further prevented.

When the functional layer is formed of the conductive material such as a metal or an alloy, the film thickness of the functional layer is further preferably one-hundredth or less the film thickness of the resistor. When such a range is set, a portion of the current flowing through the resistor flows through the functional layer, and thus reductions in detection sensitivity of strain can be further prevented.

When the functional layer is formed of an insulating material such as an oxide or a nitride, the film thickness of the functional layer is preferably 1 nm to 1 μm. When such a range is set, crystal growth of α-Cr can be promoted, and a given film can be easily formed without having any cracks in the functional layer.

When the functional layer is formed of the insulating material such as an oxide or a nitride, the film thickness of the functional layer is preferably 1 nm to 0.8 μm. When such a range is set, crystal growth of α-Cr can be promoted, and a given film can be further easily formed without having any cracks in the functional layer.

When the functional layer is formed of the insulating material such as an oxide or a nitride, the film thickness of the functional layer is more preferably 1 nm to 0.5 μm. When such a range is set, crystal growth of α-Cr can be promoted, and further, a given film can be formed more easily without having any cracks in the functional layer.

The planar shape of the functional layer is patterned to be substantially the same as the planar shape of the resistor as illustrated in FIG. 1. However, the planar shape of the functional layer is not limited when it is substantially the same as the planar shape of the resistor. When the functional layer is formed of an insulating material, the planar shape of the functional layer may not be patterned to be the same shape as the planar shape of the resistor. In this case, the functional layer may be solidly formed to correspond to a region where at least the resistor is formed. Alternatively, the functional layer may be solidly formed on the entire top surface of the substrate 10.

When the functional layer is formed of an insulating material, the functional layer is formed to be relatively thick such that the thickness of the functional layer is greater than or equal to 50 nm and less than or equal to 1 μm, and further, the functional layer is formed solidly. With this arrangement, the thickness and surface area of the functional layer are increased, and thus heat obtained when the resistor generates the heat can be dissipated toward the substrate 10. As a result, in the strain gauge 1, reductions in measurement accuracy due to self-heating of the resistor can be suppressed.

The functional layer can be vacuum-deposited by, for example, conventional sputtering in which a source material capable of forming the functional layer is the target and in which an Ar (argon) gas is supplied to a chamber. By using conventional sputtering, the functional layer is deposited while the upper surface 10*a* of the substrate 10 is etched with Ar. Thus, a deposited amount of the film of the functional layer is minimized and thus the effect of improving adhesion can be obtained.

However, this is an example of a method of depositing the functional layer, and the functional layer may be formed by any other method. For example, before depositing of the functional layer, the upper surface 10*a* of the substrate 10 is activated by plasma treatment or the like using Ar or the like to thereby obtain the effect of improving the adhesion, and subsequently, the functional layer may be vacuum-deposited by magnetron sputtering.

A combination of the material of the functional layer and the material of the metallic layer A is not particularly restricted, and can be appropriately selected for any purpose. For example, Ti is used for the functional layer, and a Cr composite film formed with α-Cr (alpha-chromium) as the main component can be deposited as the metallic layer A.

In this case, the metallic layer A can be deposited by, for example, magnetron sputtering in which a source material capable of forming the Cr composite film is the target and in which an Ar gas is supplied to a chamber. Alternatively, the metallic layer A may be deposited by reactive sputtering in which pure Cr is the target and in which an appropriate amount of nitrogen gas, as well as an Ar gas, are supplied to a chamber. In this case, by changing a supplied amount of the nitrogen gas or pressure (nitrogen partial pressure) of the nitrogen gas, or by providing a heating process to adjust heating temperature, a percentage of CrN and $Cr_2N$ included in the Cr composite film, as well as a percentage of $Cr_2N$ in CrN and $Cr_2N$, can be adjusted.

In such methods, a growth face of the Cr composite film is defined by the functional layer formed of Ti, and the Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. When the functional layer is formed of Ti, the Cr composite film may include Ti or TiN (titanium nitride).

When the metallic layer A is the Cr composite film, the functional layer formed of Ti includes all functions of a function of promoting crystal growth of the metallic layer A, a function of preventing oxidation of the metallic layer A caused by oxygen or moisture contained in the substrate 10, and a function of improving adhesion between the substrate 10 and the metallic layer A. Instead of Ti, when the functional layer is formed of Ta, Si, Al, or Fe, the functional layer also includes the same functions.

As described above, with the functional layer being provided in the lower layer of the metallic layer A, the crystal growth of the metallic layer A can be promoted and thus the metallic layer A having a stable crystalline phase can be fabricated. As a result, for the strain gauge 1, stability of the gauge characteristics can be improved. Also, a given material that constitutes the functional layer is diffused into the metallic layer A, and thus the gauge characteristics of the strain gauge 1 can be improved.

Then, the metallic layer A is patterned by photolithography and thus the resistor 30 and terminal sections 41 that have the planar shape, as illustrated in FIG. 1, are formed.

After forming of the resistor 30 and the terminal sections 41, the cover layer 60, with which the resistor 30 is coated and through which the terminal sections 41 are exposed, is formed on and above the upper surface 10*a* of the substrate 10, as necessary, so that the strain gauge 1 is completed. For example, the cover layer 60 can be fabricated by laminating, on the upper surface 10*a* of the substrate 10, a thermosetting insulating resin film in a semi-cured state such that the resistor 30 is coated therewith and the terminal sections 41 are exposed, and by performing heating to cure the thermosetting insulating resin. The cover layer 60 may be formed by applying, to the upper surface 10*a* of the substrate 10, a thermosetting insulating resin that is liquid or paste-like, such that the resistor 30 is coated therewith and the terminal sections 41 are exposed, and by performing heating to cure the thermosetting insulating resin.

Figure 3:
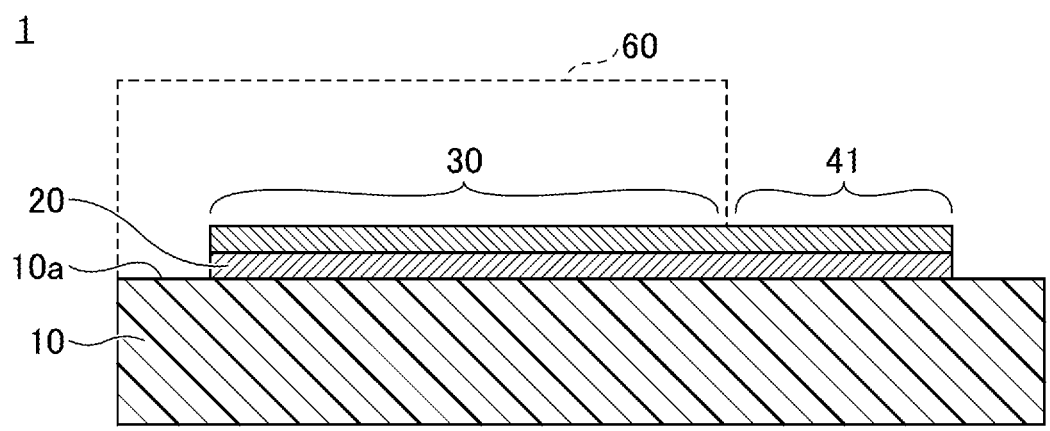
FIG. 3 is a cross-sectional view (second part) of an example of the strain gauge according to the first embodiment.

When the functional layer, as a base layer of the resistor 30 and the terminal sections 41, is provided on the upper surface 10*a* of the substrate 10, the strain gauge 1 has a cross-section shape illustrated in FIG. 3. A layer indicated by the numeral 20 expresses the functional layer. When the functional layer 20 is provided, the planar shape of the strain gauge 1 is illustrated as in FIG. 1, for example. However, as described above, the functional layer 20 may be solidly formed on a portion or entire of the upper surface of the substrate 10.

First Example

In a first example, a suitable film thickness of the resistor 30 to cause reductions in the creep amount and the recovery amount was studied. Specifically, multiple strain gauges 1, each having a resistor 30 with a different film thickness, were fabricated, and each of the strain gauges 1 was attached to a strain body that was made of SUS304. With this arrangement, creep amounts and recovery amounts were measured. As the substrate 10, a polyimide resin film having the film thickness of 25 μm was used.

Each of the creep amount and the creep recovery amount is an amount (strain amount) that changes over time of an elastically deformed amount of a given surface of the strain gauge 1 on which the resistor 30 is provided. With this arrangement, the creep amount and the recovery amount can be measured by monitoring a given voltage that is obtained in accordance with strain and is calculated based on the output between a pair of terminal sections 41. This will be described in detail with reference to FIG. 4.

Figure 4:
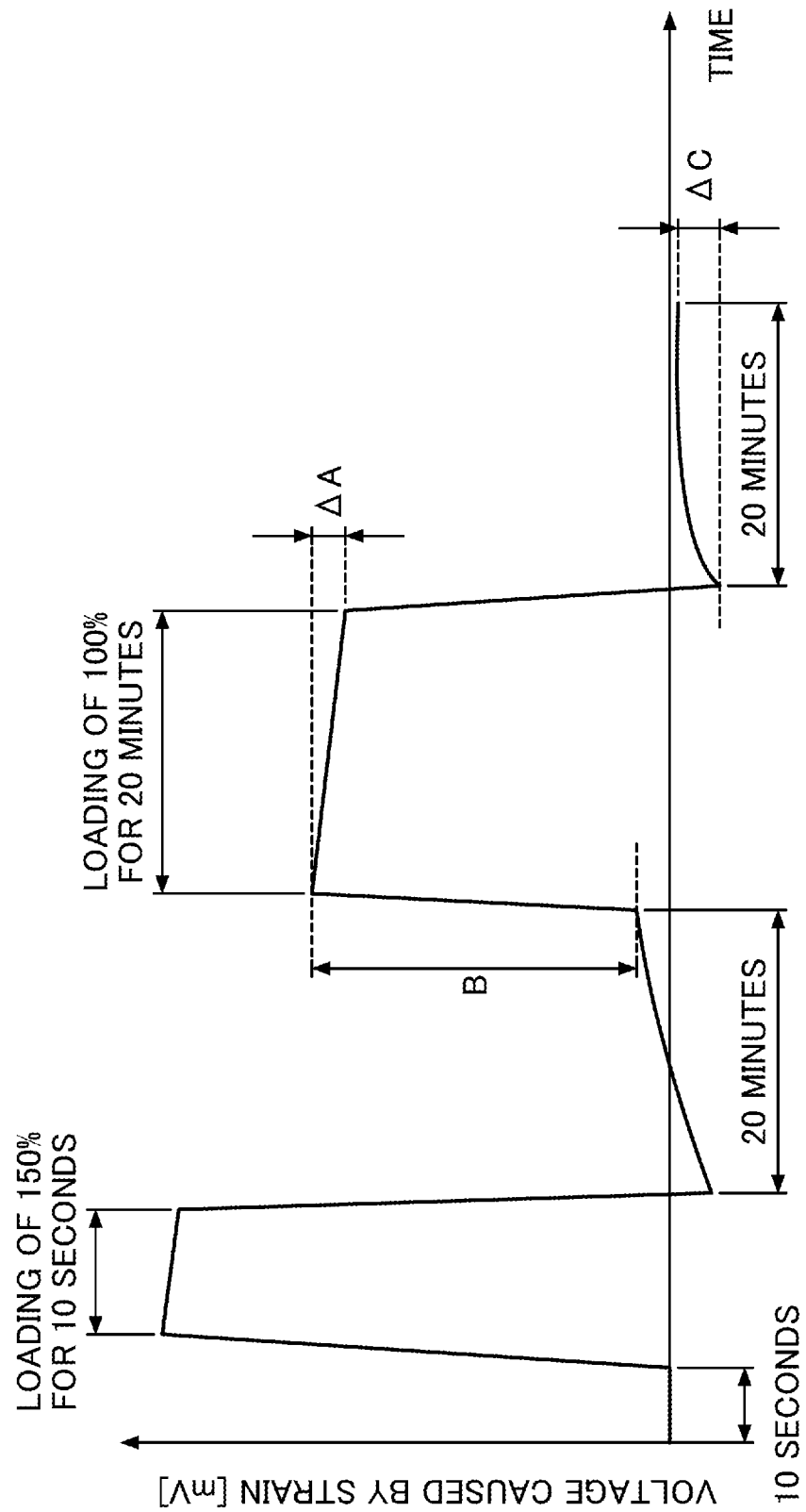
FIG. 4 is a diagram for describing a method of measuring a creep amount and a creep recovery amount.

FIG. 4 is a diagram illustrating a method of measuring the creep amount and the creep recovery amount. In FIG. 4, the horizontal axis represents the time, and the vertical axis represents the voltage obtained in accordance with strain [mV].

First, 10 seconds after a measurement apparatus is powered on, a loading of 150% is applied to the strain gauge 1 attached to a flexure element, for 10 seconds, and subsequently, the loading is removed. After removal of the load, when 20 minutes elapses, a loading of 100% is applied to the strain gauge 1 that is attached to a flexure element, for 20 minutes, and subsequently, the loading is removed. After removal of the load, it waits for 20 minutes to elapse.

The voltage obtained due to the strain varies, for example, as illustrated in FIG. 4. In FIG. 4, an absolute value B of a difference between a voltage, which is obtained due to strain and is obtained at a timing at which 20 minutes has elapsed after removal of the loading of 150%, and a voltage that is obtained due to strain and is obtained immediately after application of the loading of 100%, is measured. Also, an absolute value ΔA of a difference between the voltage that is obtained due to the strain and is obtained immediately after the application of the loading of 100%, and a voltage that is obtained due to strain and is obtained 20 minutes after the application of the loading of 100%, is measured. At this time, ΔA/B is a given creep amount. Next, an absolute value ΔC of the difference between the voltage that is due to strain and is obtained immediately after removal of the loading of 100%, and a voltage that is obtained due to strain and is obtained 20 minutes after the removal of the loading of 100%, is measured. At this time, ΔC/B is a given creep recovery amount.

The loading of 100% corresponds to 3 kg, and the loading of 150% is 1.5 times the loading of 100%.

Figure 5:
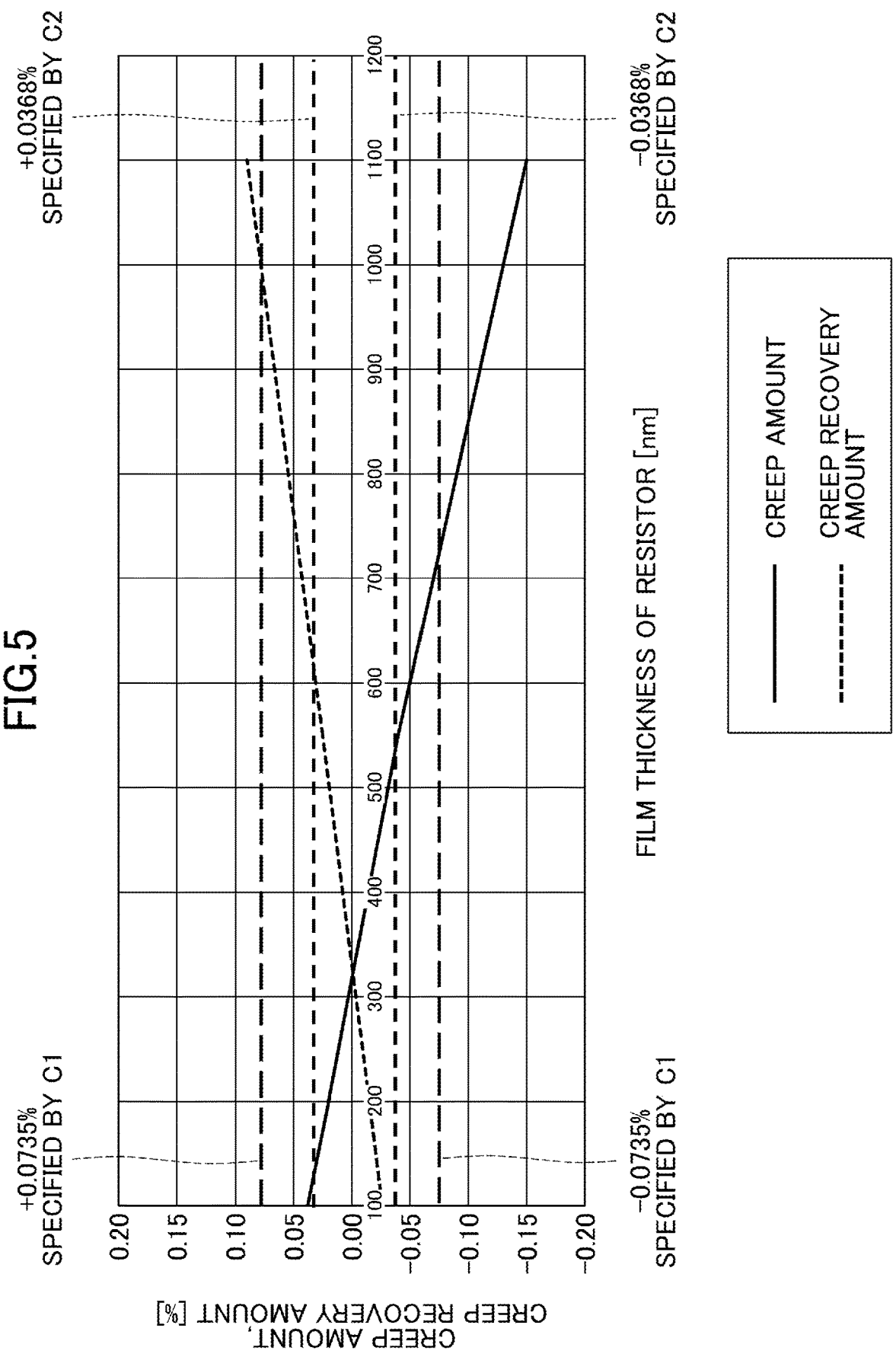
FIG. 5 is a diagram illustrating results obtained in a first example.

FIG. 5 is a diagram illustrating the results obtained in the first example. The results are summarized, where the creep amount and the creep recovery amount were measured by the measurement method as illustrated in FIG. 4, for each of the strain gauges 1 for which a different film thickness of the resistor 30 was set.

As illustrated in FIG. 5, when the film thickness of the resistor 30 is 700 nm or less, the creep amount and the creep recovery amount, as specified by the C1 standard, can be satisfied. In consideration of the fact that crystallinity of a crystal that constitutes the resistor 30 is improved when the film thickness of the resistor 30 is 100 nm or more as described above, it has been seen that the film thickness of the resistor 30 is preferably greater than or equal to 100 nm and less than or equal to 700 nm, in order to satisfy the C1 standard.

Also, as illustrated in FIG. 5, when the film thickness of the resistor 30 is greater than or equal to 150 nm and less than or equal to 500 nm, the creep amount and the creep recovery amount, as specified by the C2 standard, can be satisfied. Also, in order to reliably satisfy the C2 standard, the film thickness of the resistor 30 is preferably greater than or equal to 250 nm and less than or equal to 400 nm, in consideration of a margin of 50% (that is, in order to satisfy a value that is half a value specified by the C2 standard).

Second Example

In a second example, a suitable film thickness of the substrate 10 to cause reductions in the creep amount and the recovery amount was studied. Specifically, multiple strain gauges 1 for each of which a different film thickness of the substrate 10 was set were fabricated, and each of the strain gauges 1 was attached to a flexure element that was made of SUS304. With this arrangement, creep amounts and recovery amounts were measured. As the resistor 30, a Cr composite film having a film thickness of 220 nm was used.

Figure 6:
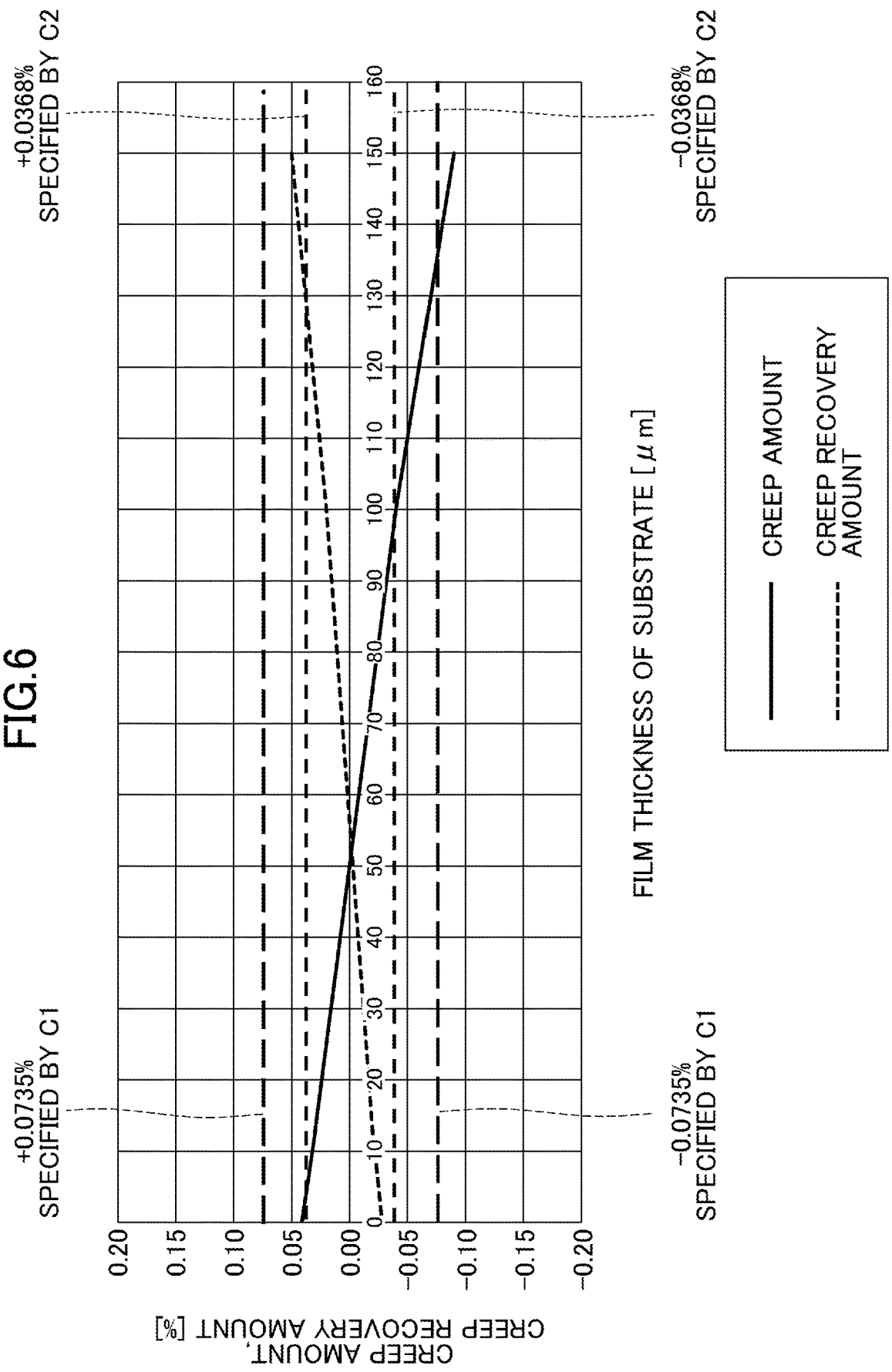
FIG. 6 is a diagram illustrating results obtained in a second example.

FIG. 6 is a diagram illustrating the results obtained in the second example. The results are summarized, where the creep amount and the creep recovery amount were measured by the measurement method as illustrated in FIG. 4, for each of the strain gauges 1 for which a different film thickness of the substrate 10 was set.

As illustrated in FIG. 6, when the film thickness of the substrate 10 is greater than or equal to 5 μm and less than or equal to 130 μm, the creep amount and the creep recovery amount, as specified by the C1 standard, can be satisfied. In consideration of the fact that insulation becomes better when the film thickness of the substrate 10 is 10 μm or more as described above, it has been seen that the film thickness of the substrate 10 is preferably greater than or equal to 10 μm and less than or equal to 130 μm, in order to satisfy the C1 standard.

Also, as illustrated in FIG. 6, when the film thickness of the substrate 10 is greater than or equal to 5 μm and less than or equal to 100 μm, the creep amount and the creep recovery amount, as specified by the C2 standard, can be satisfied. In consideration of the fact that insulation becomes better when the film thickness of the substrate 10 is 10 μm or more as described above, it has been seen that the film thickness of the substrate 10 is preferably greater than or equal to 10 μm and less than or equal to 100 μm, in order to satisfy the C2 standard.

Further, in order to reliably satisfy the C2 standard, the film thickness of the substrate 10 is greater than or equal to 30 μm and less than or equal to 70 μm, in consideration of a margin of 50% (that is, in order to satisfy a value that is half a value specified by the C2 standard).

Although the preferred embodiments and the like have been described above in detail, these embodiments and the like are not limiting. Various modifications and alternatives to the above embodiments and the like can be made without departing from a scope set forth in the claims.

This International application claims priority to Japanese Patent Application No. 2020-060534, filed Mar. 30, 2020, the contents of which are incorporated herein by reference in their entirety.

REFERENCE SIGNS LIST 1 strain gauge, 10 substrate, 10a upper surface, 20 functional layer, 30 resistor, 41 terminal section, 60 cover layer

The invention claimed is:
1. A strain gauge comprising:
a flexible resin substrate; and
a resistor formed of a film that includes a composite film of Cr, CrN, and $Cr_2N$, the resistor being situated on or above the substrate,
wherein a film thickness of the resistor is greater than or equal to 100 nm and less than or equal to 700 nm, and each of a creep amount and a creep recovery amount of a weighing instrument including the strain gauge is within ±0.0735% when measured with the weighing instrument according to International Organization of Legal Metrology (OIML) R60.
2. The strain gauge according to claim 1, wherein the film thickness of the resistor is greater than or equal to 150 nm and less than or equal to 500 nm.
3. The strain gauge according to claim 2, wherein the film thickness of the resistor is greater than or equal to 250 nm and less than or equal to 400 nm.

4. The strain gauge according to claim 1, wherein a film thickness of the substrate is greater than or equal to 10 µm and less than or equal to 130 µm.

5. The strain gauge according to claim 4, wherein the film thickness of the substrate is greater than or equal to 10 µm and less than or equal to 100 µm.

6. The strain gauge according to claim 5, wherein the film thickness of the substrate is greater than or equal to 30 µm and less than or equal to 70 µm.

7. The strain gauge according to claim 1, wherein a material of the substrate is polyimide.

8. The strain gauge according to claim 1, wherein a gauge factor is 10 or more.

9. The strain gauge according to claim 1, wherein CrN and $Cr_2N$ included in the resistor are at 20% by weight or less.

10. The strain gauge according to claim 1, wherein a percentage of $Cr_2N$ in the CrN and $Cr_2N$ is greater than or equal to 80% by weight and less than 90% by weight.

* * * * *